United States Patent [19]

Takahashi

[11] Patent Number: 5,699,531
[45] Date of Patent: Dec. 16, 1997

[54] INTERCONNECTED COMPUTERS FOR REDUCING THE AMOUNT OF DATA TRANSMISSIONS THEREBETWEEN

[75] Inventor: Kazutoshi Takahashi, Tokyo, Japan

[73] Assignee: NEC Corporation, Tokyo, Japan

[21] Appl. No.: 546,083

[22] Filed: Oct. 20, 1995

[30] Foreign Application Priority Data

Oct. 25, 1994 [JP] Japan ................... 6-260478

[51] Int. Cl.$^6$ .............................. G06F 7/00; G06F 13/00
[52] U.S. Cl. ...................... 395/285; 395/286; 395/200.01
[58] Field of Search ...................... 395/285, 200.01, 395/200.12, 286, 800; 370/235

[56] References Cited

U.S. PATENT DOCUMENTS

| | | | |
|---|---|---|---|
| 4,559,614 | 12/1985 | Peek et al. | 395/500 |
| 4,672,543 | 6/1987 | Matsui et al. | 395/800 |
| 4,862,461 | 8/1989 | Blaner | 371/33 |
| 5,245,609 | 9/1993 | Ofek et al. | 370/235 |
| 5,490,252 | 2/1996 | Macera et al. | 395/200.01 |
| 5,534,912 | 7/1996 | Kostreski | 348/6 |
| 5,539,884 | 7/1996 | Robrock, II | 395/200.12 |
| 5,574,723 | 11/1996 | Killian et al. | 370/68.1 |
| 5,621,894 | 4/1997 | Menezes et al. | 395/200.12 |

FOREIGN PATENT DOCUMENTS 23845  1/1990  Japan .

OTHER PUBLICATIONS

D.E. Comer; "Internetworking With TCP/IP, vol. 1: Principles, Protocols, and Architecture", 2d Edition; Prentice-Hall International, Inc., 1991, p. 186.

*Primary Examiner*—Gopal C. Ray
*Attorney, Agent, or Firm*—Whitham, Curtis, Whitham & McGinn

[57] ABSTRACT

A computer system includes first and second subsystems. The first subsystem is provided with a function of generating control data of message data. The second subsystem does not have such a function. The message data is stored in the second subsystem. When the second subsystem transmits the message data, the second subsystem sends format information of the message data to the first subsystem. The first subsystem generates intermediate control data referring to the format information. When the first subsystem encounters an operation requiring reference to the message data, the first subsystem skips this operation. As a result, some portions of the intermediate control data remain blank. The first subsystem sends the intermediate control data back to the second subsystem. The second subsystem generates the control data from the intermediate control data referring to the message data stored therein. Thus, the control data is generated without exchanging the message data between the first and second subsystems.

16 Claims, 9 Drawing Sheets

| OPERATIONAL INFORMATION 104 | |
|---|---|
| POSITION | OPERATION |
| 001 | CHECKSUM |
| 002 | CHECKSUM |

INTERCONNECTED COMPUTERS FOR REDUCING THE AMOUNT OF DATA TRANSMISSIONS THEREBETWEEN

BACKGROUND OF THE INVENTION

The present invention relates to a computer system including interconnected subsystems, and more particularly to a computer system in which the subsystems collaborate to process a data transmission to/from outside of the system.

Japanese Unexamined Patent Publication No. 3845/1990 discloses a conventional computer system in which subsystems collaborate to process a data transmission.

This conventional system includes a plurality of computers and a bus connecting the computers.

Each computer has first and second functions of a protocol processing. In a complete protocol processing, the first and second functions are performed one after another. Specifically, the first and second functions deal with levels above and below a network layer, respectively.

The computer can transmit data using the first and second functions in other computers instead of the functions therein. Furthermore, the first and second functions can be located in different computers.

Referring to FIG. 1 of the reference, computers #1 to #3 each have first functions A-1 to A-3 and second functions B-1 to B-3. The computer #2 communicates with a computer system Y through the first function A-2 therein and the second function B-1 in the computer #1.

However, this system has the following problems.

When a first computer sends or receives data through functions in a second computer, the first computer must transmit message data, which forms the main body of transmission data, to the second computer because some steps of protocol processing (e.g., calculation of a checksum) necessitate referring to the entirety of the message data. This data transmission is time consuming and degrades the performance of the system.

This problem becomes especially serious when some of the computers do not have the functions and completely depend on other computers. Such computers must send the message data to a computer having the functions whenever it sends the message data.

The same problem occurs when the computer receives data from other computer systems.

SUMMARY OF THE INVENTION

In view of the aforementioned problem, one object of the present invention is to improve efficiency of data transmission between a computer system including subsystems and another computer system.

Another object of the present invention is to reduce the amount of data transmitted between the subsystems.

Yet another object of the present invention is to perform protocol processing and data transmission in different subsystems without increasing the amount of data transmitted between the subsystems.

According to the present invention, first and second subsystems produce transmission data, which includes message data and control data, following the steps stated below.

In a first step, the first system is provided with a function of generating the control data.

In a second step, the message data is stored in the second subsystem.

In a third step, format information of the message data is sent from the second subsystem to the first subsystem.

In a fourth step, intermediate control data is generated in the first subsystem referring to the format information.

In a fifth step, the intermediate control data is sent from the first subsystem to the second subsystem.

In a sixth step, the control data is generated from the intermediate control data referring to the message data in the second subsystem.

In the fourth step, an operation requiring reference to the message data may be skipped.

In the fifth step, information indicative of the operation is sent from the first subsystem to the second subsystem. In the sixth step, the operation may be performed and the intermediate control data may be modified based on a result of the operation.

According to the present invention, first and second subsystems check error in message data following the steps stated below.

In a first step, the first system is provided with a function of error checking.

In a second step, the transmission data is received at the second subsystem.

In a third step, the control data and format information of the transmission data are sent from the second subsystem to the first subsystem.

In a fourth step, intermediate checking result data is generated in the first subsystem referring to the control data and the format information.

In a fifth step, the intermediate checking result data is sent from the first subsystem to the second subsystem.

In a sixth step, a transmission error is checked in the second subsystem referring to the intermediate checking result data and the message data.

In the fourth step, an operation requiring reference to the message data may be skipped.

In the fourth step, information indicative of the operation and a normal result of the operation may be generated.

In the sixth step, the operation may be performed and a result thereof may be compared to the normal result.

BRIEF DESCRIPTION OF THE DRAWINGS

Other objects, features and advantages of the present invention will become more apparent when the following description is read in conjunction with the accompanying drawings, wherein.

DETAILED DESCRIPTION OF THE PREFERRED EMBODIMENTS

Next is described a first embodiment of the present invention. In the first embodiment, control data (e.g., as a header or a trailer of the main message data) is generated as a protocol processing.

Figure 1:
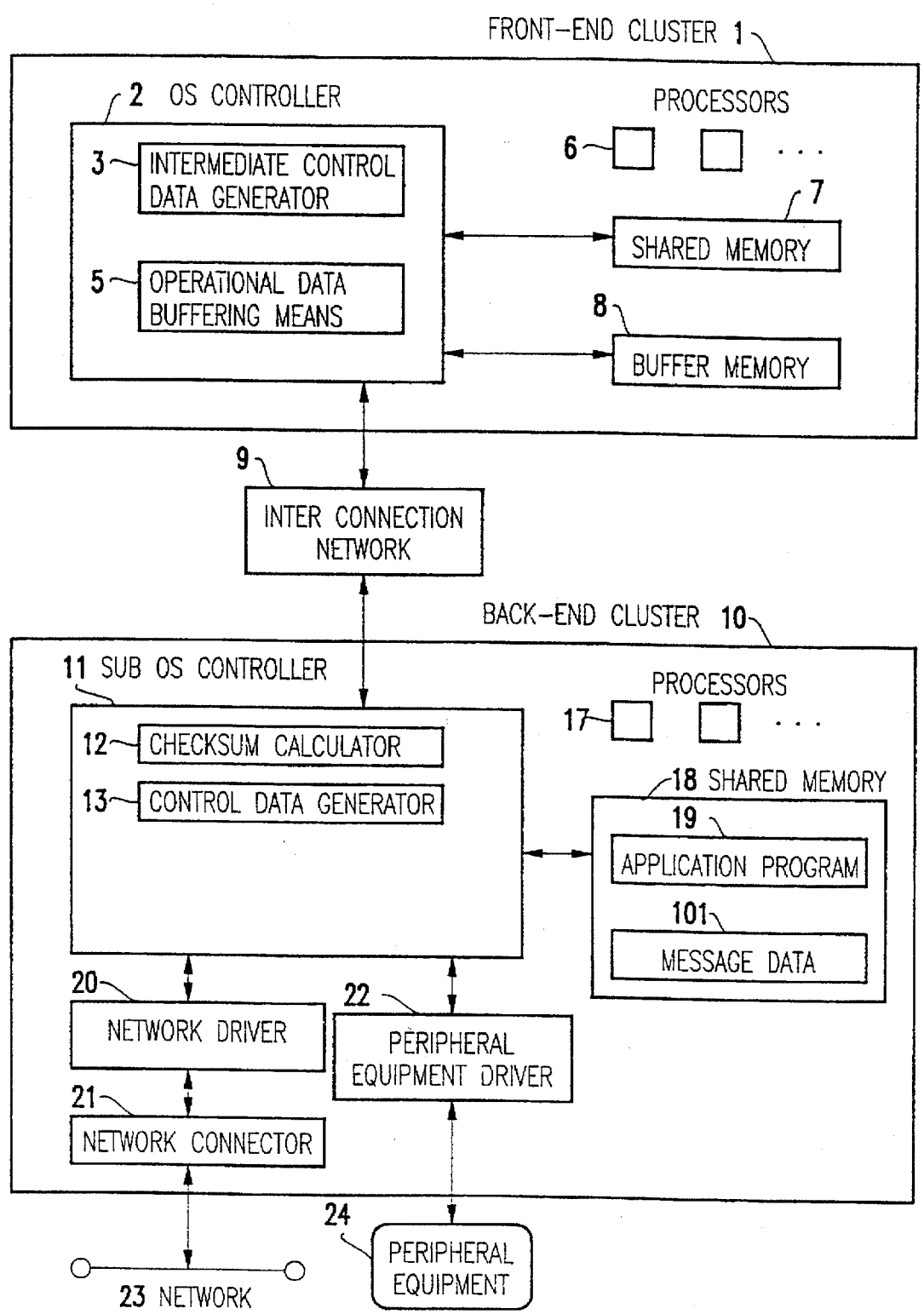
FIG. 1 is a block diagram of a first embodiment of the present invention.

Referring to FIG. 1, a computer system according to the first embodiment includes a front-end cluster 1 and a back-end cluster 10 as subsystems. The front-end cluster 1 and back-end cluster 10 are connected through an interconnection network 9.

The front-end cluster 1 generates control data, but the back-end cluster 10 does not have a similar function. Therefore, the back-end cluster 10 generates the control data in cooperation with the front-end cluster 1 when the back-end cluster 10 transmits data externally.

The front-end cluster 1 includes processors 6, a shared memory 7 and a buffer memory 8. The front-end cluster 1 further includes an operating system (OS) controller 2 which performs a protocol processing.

The OS controller 2 includes a header generator 3 and operational data buffering means 5 both of which are preferably implemented by programs executed by the processors 6. The operations of the header generator 3 and the operational data buffering means 5 are described below.

The back-end cluster 10 is connected to a network 23 (e.g., a local area network) and peripheral equipment 24 (e.g., a storage device).

The back-end cluster 10 includes processors 17, a shared memory 18, network driver 20, network connector 21 and a peripheral equipment driver 22. The shared memory 18 stores an application program 19 and message data 101. The back-end cluster 10 further includes a sub OS controller 11.

The sub OS controller 11 need not have a function of generating the control data by itself because it can generate the control data in cooperation with the OS controller 2 in the front-end cluster 1.

The sub OS controller 11 includes a checksum calculator 12, a control data generator 13 both of which are preferably implemented by programs executed by the processors 17.

The checksum calculator 12 calculates a checksum of the message data 101. The operation of the control data generator 13 is described below.

The sub OS controller 11 exchanges information with the OS controller 2 through the interconnection network 9. The sub OS controller 11 exchanges information with other computer systems through the network driver 20, the network connector 21 and the network 23. The sub OS controller 11 exchanges information with peripheral equipment 24 through the peripheral equipment driver 22.

Next is described the operation of the first embodiment of the present invention referring to an exemplary operation. In this exemplary operation, the back-end cluster 10 sends transmission data to the network 23.

Figure 2:
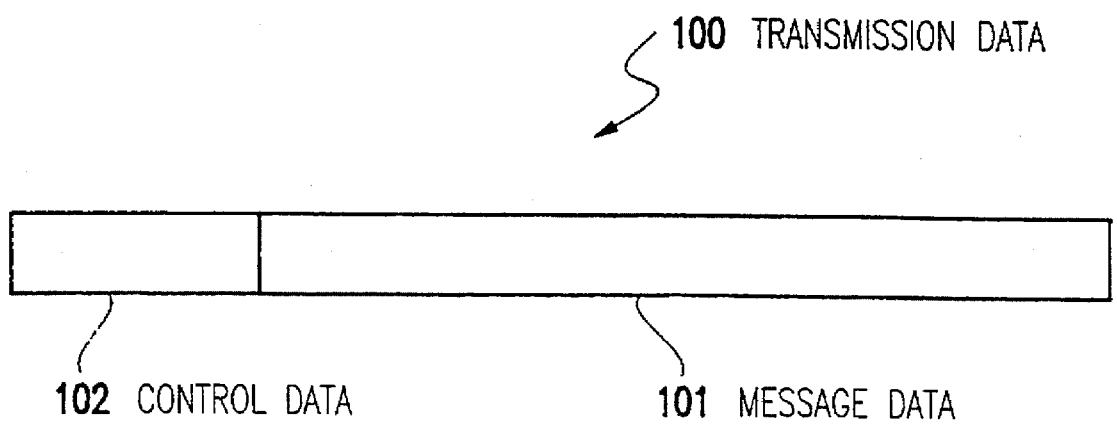
FIG. 2 shows the structure of transmission data 100.

Referring to FIG. 2, transmission data 100 includes the message data 101 and control data 102. The message data 101 represents the information to be transmitted. The control data 102 (e.g., a header or a trailer) is added to the message data 101 to ensure a successful data transmission.

As stated above, the back-end cluster 10 does not generate the control data 102 by it self. Therefore, the back-end cluster 10 generates the control data 102 in cooperation with the OS controller 2 in the front-end cluster 1.

Specifically, the front-end cluster 1 generates intermediate control data without referring to the message data 101. Thereafter, the back-end cluster 10 generates the control data 102 from the intermediate control data referring to the message data 101. Thus, the control data 102 is generated without exchanging the message data 101 between the front-end cluster 1 and back-end cluster 10.

Figure 3:
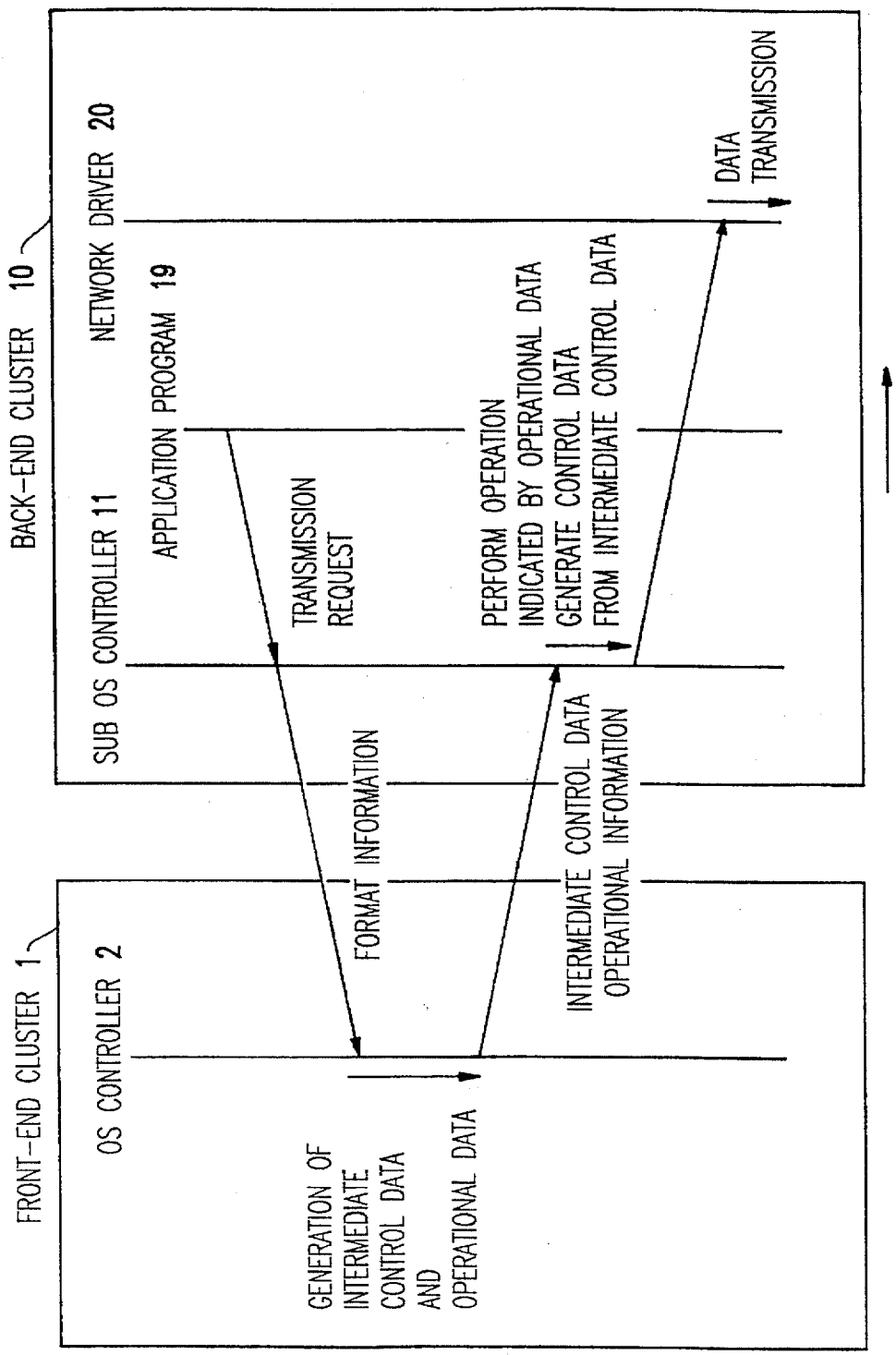
FIG. 3 illustrates the operation of the first embodiment according to the present invention.
Figure 4:
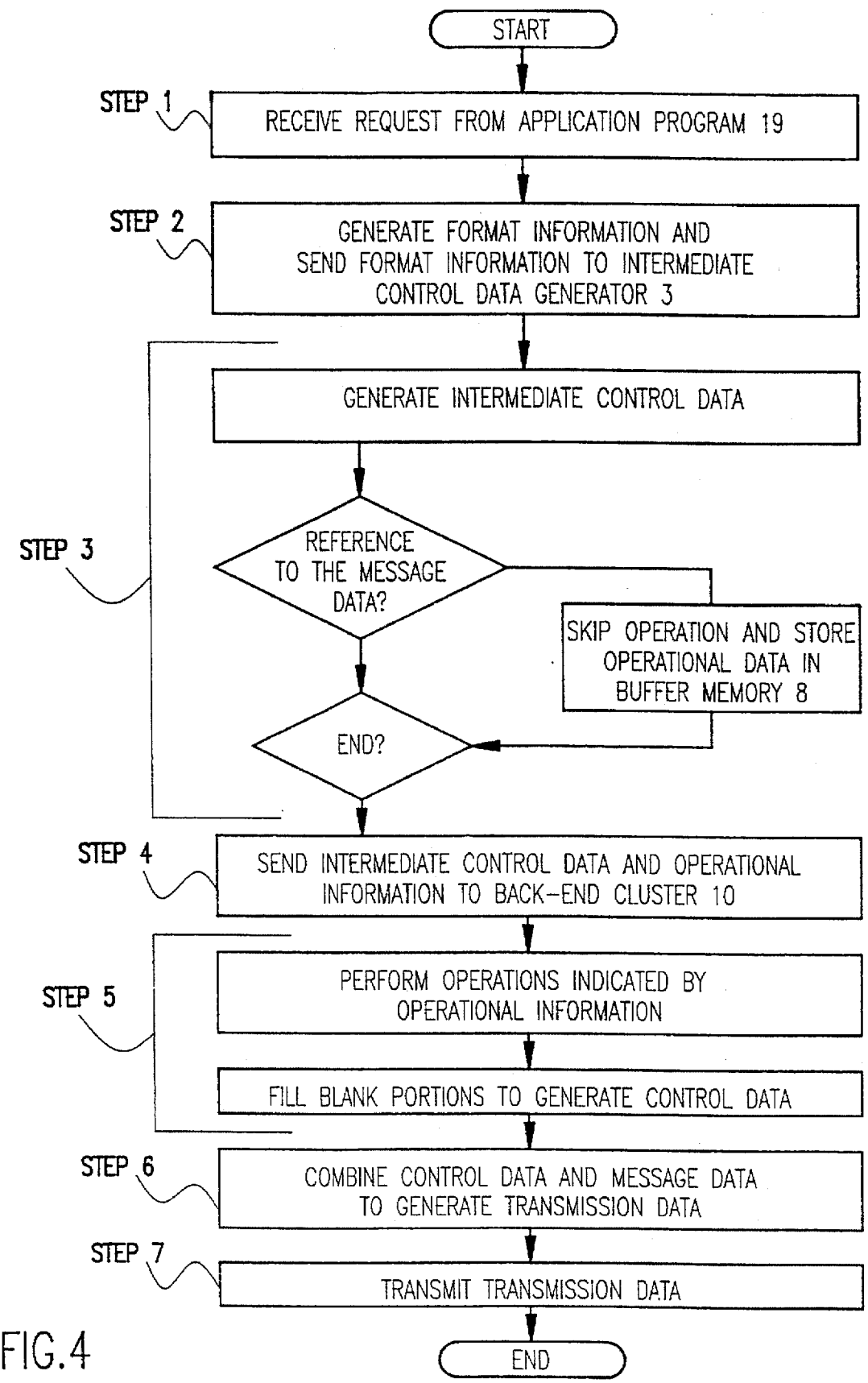
FIG. 4 is a flowchart illustrating the operation of the first embodiment.

Referring to FIGS. 3 and 4, in step 1, the application program 19 requests the sub OS controller 11 to send the message data.

In step 2, the control data generator 13 generates format information (e.g., the length of the message data 101) of the message data 101. Thereafter, the control data generator 13 sends this format information to the intermediate control data generator 3 in the front-end cluster 1 through the interconnection network 9.

In step 3, the intermediate control data generator 3 generates intermediate control data according to the format information received from the back-end cluster 10.

Figures 5A, 5B:
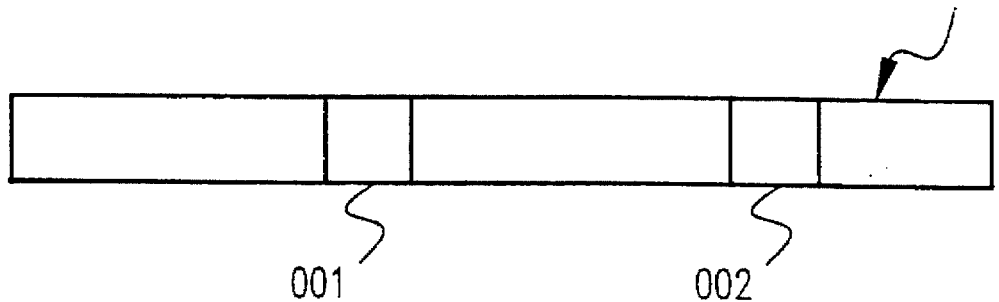
FIG. 5(a) shows the structure of intermediate control data 103.
FIG. 5(b) shows the structure of operational information 104.

Referring to FIG. 5(a), the intermediate control data generator 3 generates the intermediate control data 103 in the same way as the generation of control data until it encounters an operation (e.g., a checksum calculation) that requires reference to the message data 101.

When such an operation is encountered, the intermediate control data generator 3 skips this operation. As a result, some portions of intermediate control data 103 remain blank.

In this exemplary operation, the intermediate control data generator 3 skips the generation of the portions 001 and 002 which necessitate a checksum calculation. The front-end cluster 1 cannot calculate the checksum because it does not store the message data 101. Therefore, the portions 001 and 002 remain blank. The control data 102 is produced by inserting the result of the checksum calculation into the portions 001 and 002.

Referring to FIG. 5(b), the intermediate control data generator 3 generates operational information 104 when it skips an operation. The operational information 104 indicates the positions of the blank portions and the operations to be performed to fill the blank portions.

The operational information 104 is stored in the buffer memory 8 by the operational data buffering means 5. When a plurality of operations are skipped, a plurality of items of the operational information are stacked in the buffer memory 8 to form the operational information 104.

In this exemplary operation, the operational data 104 indicates that the blank portions 001 and 002 are to be filled based on the result of the checksum calculation.

Referring again to FIGS. 3 and 4, in step 4, the intermediate control data generator 3 sends back the intermediate control data 103 and the operational data 104 to the control data generator 13 in the back-end cluster 10 through the interconnection network 9.

In step 5, the control data generator 13 generates the control data 102. Specifically, the control data generator 13 performs the operations (e.g., the checksum calculation) indicated by the operational information 104 and, thereafter, fills the blank portions of the intermediate control data 103 according to the result of the operations. Thus, the control data 102 is generated.

Referring to FIGS. 5(a) and 5(b), in this exemplary embodiment, the control data generator 13 performs checksum calculation, which is indicated by the operational information 104, and inserts the result into the blank portions 001 and 002. In this exemplary embodiment, the checksum is calculated by the checksum calculator 12.

Referring again to FIGS. 3 and 4, in step 6, the sub OS controller 11 adds the control data 102 to the message data 101 to generate the transmission data 100.

In step 7, the sub OS controller 11 sends the transmission data 100 to the network 23 through the network driver 20 and the network connector 21.

As mentioned above, according to the first embodiment, the control data 102 is generated without transmitting the message data 101 between the front-end cluster 1 and the back-end cluster 10. Thus, the first embodiment reduces the amount of data transmitted between the front-end cluster 1 and the back-end cluster 10.

Next is described a modification of the first embodiment.

The control data 102 may be a header or a trailer of the message data 101. The control data 102 may be produced so that it complies with the Transmission Control Protocol/Internet Protocol (TCP/IP) standard.

The transmission data 100 may be transmitted to the peripheral equipment 24 through the peripheral equipment driver 22. In this case, the control data 102 (e.g., a header or a trailer) is generated to meet the specification of the peripheral equipment 24.

The intermediate control data generator 3 may skip an operation only when the amount of the referred portion of the message data 101 exceeds a predetermined level (e.g., the entire message data 101). The checksum calculation is an example of operations that refer to the entire message data 101. In this case, when the amount of the referred portion is below the predetermined level, the referred portion is sent from the back-end cluster 10 to the front-end cluster 1. The predetermined level is set according to the designer's requirements and objectives.

Next is described a second embodiment of the present invention. In the second embodiment, the back-end cluster 10 receives transmission data 100, and performs error checking of the message data 101 in cooperation with the front-end cluster 1.

Figure 6:
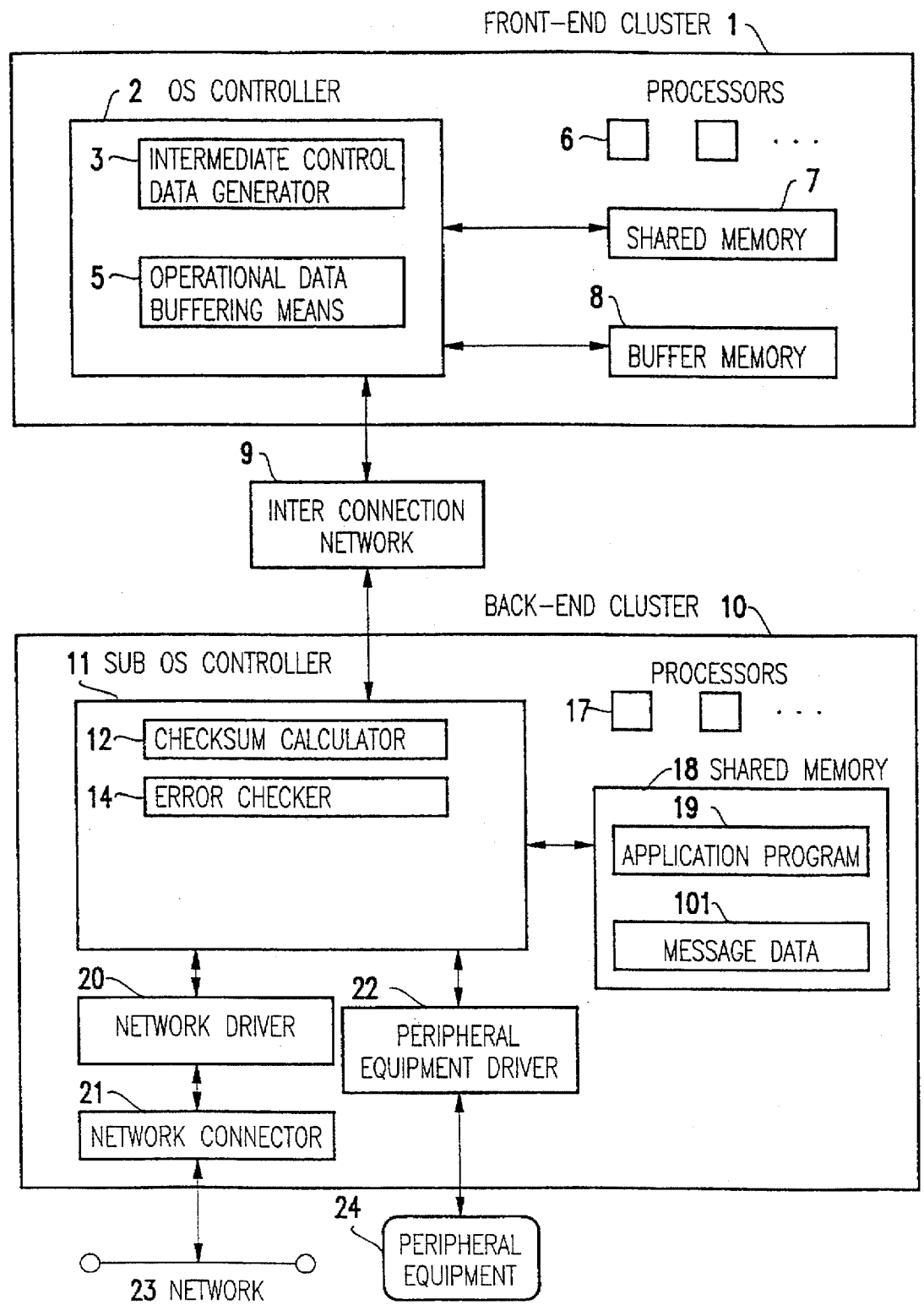
FIG. 6 is a block diagram of a second embodiment of the present invention.

Referring to FIG. 6, a computer system according to the second embodiment includes an intermediate check result generator 4 and an error checker 14 instead of the intermediate control data generator 3 and the control data generator 13, respectively, of the first embodiment. The intermediate check result generator and the error checker 14 are preferably implemented by programs executed by the processors 6 and the processors 17, respectively.

Next is described the operation of the second embodiment referring to an exemplary operation.

In the second embodiment, the back-end cluster 10 does not check errors in the transmission data by itself. Therefore, the back-end cluster 10 performs error checking in cooperation with the front-end cluster 1 that has such a function.

In the second embodiment, among other operations referring to the entire message data 101, the checksum calculation is performed first and the result thereof is sent to the front-end cluster 1. The reason for performing the checksum calculation first is because the checksum is used for error checking in most cases. When the front-end cluster 1 encounters an operation that refers to the message data (except the checksum calculation), the front-end cluster 1 skips the operation as in the first embodiment.

Figure 7:
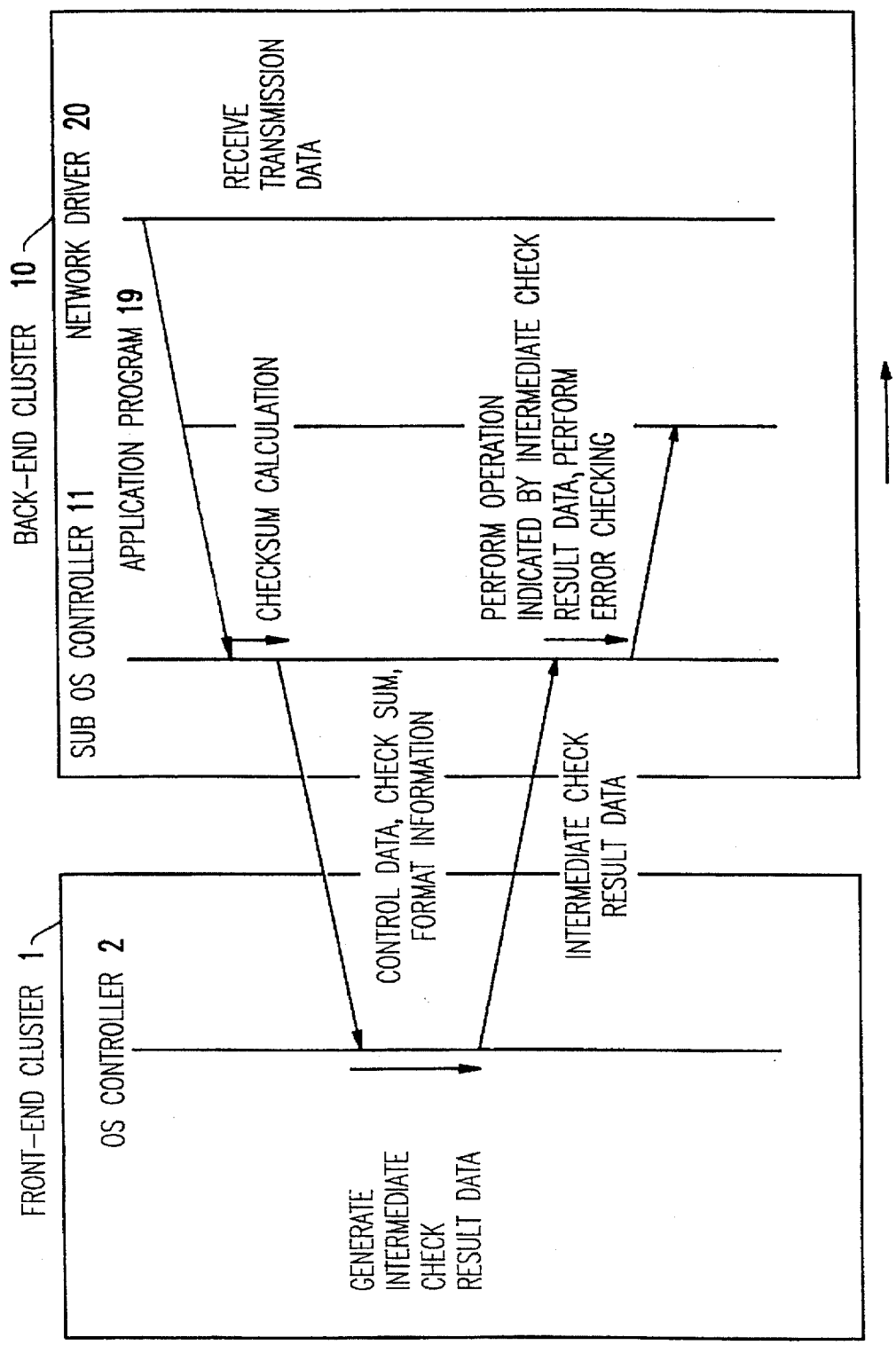
FIG. 7 illustrates the operation of the first embodiment.
Figure 8:
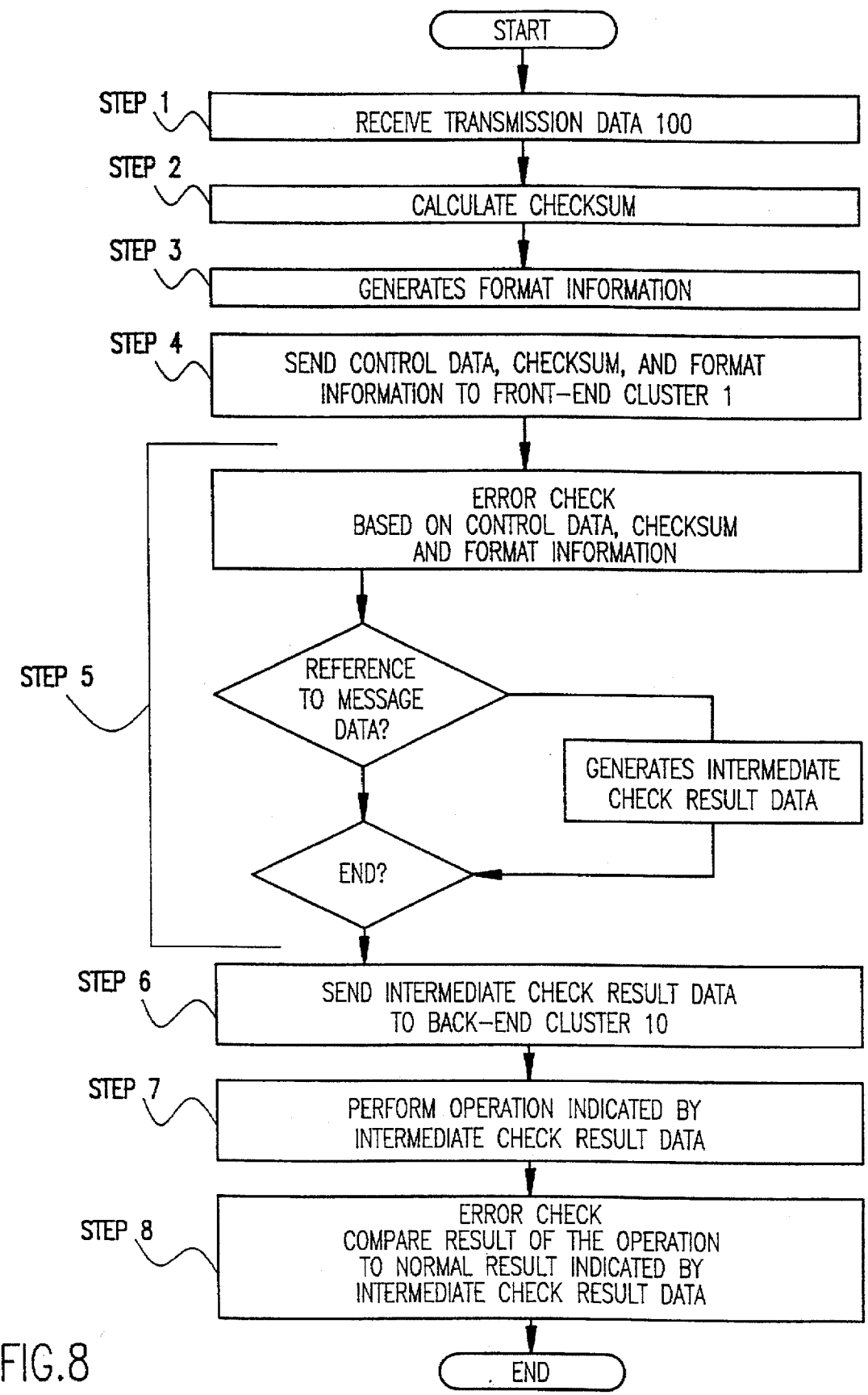
FIG. 8 is a flowchart illustrating the operation of the second embodiment.

Referring to FIGS. 7 and 8, in step 1, the sub OS controller 11 receives the transmission data 100 through the network 23, the network connector 21, and the network driver 20.

In step 2, the checksum calculator 12 calculates the checksum of the transmission data 100.

In step 3, the error checker 14 generates format information (e.g., a data length) of the transmission data.

In step 4, the error checker 14 sends to the front-end cluster 1 the checksum, the format information, and the control data 102 of the transmission data 100.

In step 5, the intermediate check result generator 4 in the front-end cluster 1 checks the error in the transmission data 100 based on the control data 102 and the format information.

Figure 9:
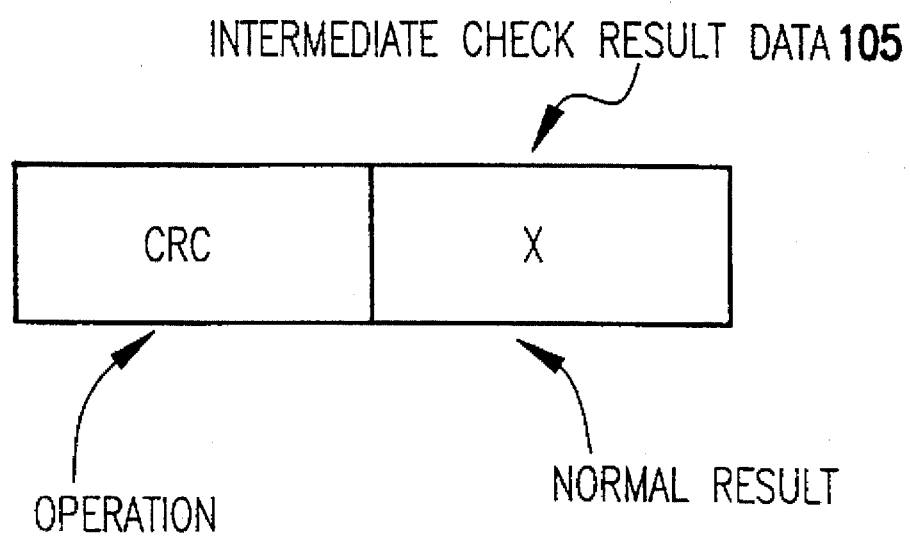
FIG. 9 shows the structure of intermediate check result data 105.

Referring to FIG. 9, when the operation referring to the message data 101 is encountered in error checking, the operation is skipped and intermediate check result data 105 is generated. The intermediate check result data 105 is stored in the buffer memory 8 by the operational data buffering means 5.

The intermediate check result data 105 indicates the skipped operation and the normal result of the operation. The "normal result" means a result of the operation that is obtained when the transmission data includes no error.

In this exemplary operation, the intermediate check result data 105 indicates the cyclic redundancy checking (CRC) as the operation and a value "X" as the normal result.

Referring again to FIGS. 7 and 8, in step 6, the intermediate check result generator 4 sends the intermediate check result data 105 to the back-end cluster 10 through the interconnection network 9.

In step 7, the error checker 14 performs the operation indicated by the intermediate check result data 105.

In step 8, the error checker 14 compares the result of the operation with the normal result indicated by the intermediate check result data 105.

If the result of the operation matches the normal result, the error checker 14 determines that the transmission data 100 was successfully transmitted and does not contain an error. Otherwise, the error checker determines that the transmission data 100 contains an error.

In this exemplary case, if the result of the CRC operation is equal to "X", the transmission data 100 is determined to be error-free.

As stated above, according to the second embodiment, although the back-end cluster 10 does not have an error checking function, it can check the error in the transmission data 100 without sending the message data 101 to the front-end cluster 1. Thus, the second embodiment reduces the amount of data transmitted between the front end cluster 1 and the back-end cluster 10.

Next is described a modification of the second embodiment.

The sub OS controller 11 may process or modify the transmission data 100 after step 8. For example, a plurality of transmission data 100 (e.g., data packets) may be combined to form higher-level data.

The intermediate check result generator 4 may send intermediate check result data 105 along with other information required for error checking in the back-end cluster 10.

The back-end cluster 10 may not send the checksum along with the format information. In this case, the checksum calculation is skipped by the intermediate check result generator 4 and registered in the intermediate check result data 105 as the CRC operation.

The transmission data 100 may be received from the peripheral equipment 24 instead of the network 23.

The transmission data 100 may not include the control data 102. In this case, the error checker 14 does not send the control data 102 to the front-end cluster 1 in step 4.

Next is described a modification of the present invention.

The scope of the present invention is not limited to the operations of control data generation or the error checking which are described in the first and second embodiments, respectively. The present invention can be applied to any processes (e.g., a protocol process) performed on the transmission data 100.

The present invention also can be applied to any computer systems including at least two inter-connected subsystems, one of which lacks the function to perform a certain kind of process.

The present embodiments are therefore, to be considered in all respects as illustrative and not restrictive, the scope of the invention being indicated by the appended claims rather than by the foregoing description and all changes which come within the meanings and range of equivalency of the claims are therefore intended to the embraced therein.

What is claimed is:

1. A method of producing transmission data including message data and control data for a computer system, said computer system including first and second subsystems, said method comprising steps of:

(a) providing said first subsystem with a function of generating said control data;

(b) storing said message data in said second subsystem;

(c) sending format information of said message data from said second subsystem to said first subsystem;

(d) generating intermediate control data in said first subsystem referring to said format information;

(e) sending said intermediate control data from said first subsystem to said second subsystem; and (f) generating said control data from said intermediate control data referring to said message data in said second subsystem.

2. A method according to claim 1, wherein step (d) includes a step of skipping an operation that requires referring to said message data.

3. A method according to claim 2, wherein step (e) includes a step of:

(e-1) sending information indicative of said operation from said first subsystem to said second subsystem, and wherein step (f) includes steps of:

(f-1) performing said operation; and (f-2) modifying said intermediate control data based on a result of said operation.

4. A method according to claim 2, wherein step (d) includes a step of skipping an operation that requires referring to all portions of said message data.

5. A method according to claim 2, wherein step (d) includes a step of skipping calculating a checksum of said message data.

6. A method according to claim 1, wherein step (f) includes a step of generating at least one of a header and a trailer.

7. A method according to claim 1, wherein step (a) includes a step of installing an operating system.

8. A method according to claim 1, wherein said step of generating control data comprises generating said control data without exchanging message data between said first and second subsystems.

9. An information processing apparatus for generating transmission data including control data and message data, comprising:

a first subsystem;

a second subsystem operatively coupled to said first subsystem;

said second subsystem including means for storing said message data and means for sending format information of said massage data to said first subsystem;

said first subsystem including means for generating intermediate control data referring to said format information and for sending said intermediate control data to said second subsystem; and said second subsystem further including means for generating said control data from said intermediate control data referring to said message data.

10. An apparatus according to claim 9, wherein said means for generating intermediate control data includes means for skipping an operation that requires referring to said message data.

11. An apparatus according to claim 10, wherein said means for generating intermediate control data includes means for sending information indicative of said operation to said second subsystem, and wherein said means for generating said control data includes means for performing said operation and modifying said intermediate control data based on a result of said operation.

12. An apparatus according to claim 9, wherein said means for generating intermediate control data includes means for skipping an operation that requires referring to all portions of said message data.

13. An apparatus according to claim 9, wherein said means for generating intermediate control data includes means for skipping calculating a checksum of said message data.

14. An apparatus according to claim 9, wherein said means for generating said control data includes means for generating at least one of a header and a trailer.

15. An apparatus according to claim 9, wherein said means for generating intermediate control data includes an operating system installed in said first subsystem.

16. An apparatus according to claim 9, wherein said second subsystem generates said control data without sending said message data to said first subsystem.

* * * * *